(12) United States Patent
Allen et al.

(10) Patent No.: US 7,989,775 B2
(45) Date of Patent: Aug. 2, 2011

(54) SENSOR SYSTEMS AND METHODS USING ENTANGLED QUANTA

(75) Inventors: Edward H. Allen, Bethesda, MD (US); Andrew G. York, College Park, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/848,988

(22) Filed: Aug. 2, 2010

(65) Prior Publication Data
US 2011/0026614 A1 Feb. 3, 2011

Related U.S. Application Data

(63) Continuation-in-part of application No. 12/116,559, filed on May 7, 2008, now Pat. No. 7,767,976, which is a continuation-in-part of application No. 11/198,829, filed on Aug. 4, 2005, now Pat. No. 7,375,802.

(51) Int. Cl.
*G01J 5/02* (2006.01)

(52) U.S. Cl. ....................... 250/393

(58) Field of Classification Search .............. 250/393
See application file for complete search history.

(56) References Cited

U.S. PATENT DOCUMENTS

| 6,043,920 A * | 3/2000 | Leopold et al. ............ 398/185 |
| 2003/0039012 A1 * | 2/2003 | Pezzaniti et al. ........... 359/156 |
| 2003/0233931 A1 * | 12/2003 | Nemtsev .................. 89/1.11 |

* cited by examiner

*Primary Examiner* — David P Porta
*Assistant Examiner* — Kiho Kim
(74) *Attorney, Agent, or Firm* — McDermott Will & Emery LLP (57) ABSTRACT

A sensor system comprises an entangled quantum generator operable to generate an entangled quanta signal including a plurality of entangled quanta. A carrier signal generator generates a carrier signal that includes electromagnetic field (EMF) pulses. The power of the carrier signal is less than the power required to ionize a propagating medium through which the carrier signal is traveling. A beam combiner is configured to output a combined signal that includes the entangled quanta signal in an EMF pulse of the carrier signal. A quantum detector is configured to detect a return signal based on the combined signal being reflected by a target.

20 Claims, 6 Drawing Sheets

SENSOR SYSTEMS AND METHODS USING ENTANGLED QUANTA

CROSS-REFERENCES TO RELATED APPLICATIONS

This application is a continuation-in-part of, and claims the benefit of priority from, U.S. application Ser. No. 12/116,559, filed May 7, 2008, now issued as U.S. Pat. No. 7,767,976, which is a continuation-in-part of, and claims the benefit of priority from, U.S. application Ser. No. 11/198,829, filed Aug. 4, 2005, now issued as U.S. Pat. No. 7,375,802, the entire content of each of which is incorporated herein by reference.

BACKGROUND

The "Rayleigh diffraction limit", which is the spatial resolution with which an object can be detected, is limited by the wavelength of the radiation used for detection. Higher frequencies are therefore required to resolve smaller objects.

Microwaves of high frequency are absorbed in the atmosphere at rates exponentially higher than microwaves of low frequency. Accordingly, low frequency radar is preferred for longer range. However, due to the Rayleigh diffraction limit, the ability to distinguish two objects adjacent to each other, referred to as "resolving power", is proportional to the ratio of wave length to aperture. As a result, for a unit aperture, radar can only distinguish an object if the wavelength of the electromagnetic radiation is the same or smaller than the object. The Rayleigh diffraction limit combined with the earth atmosphere's attenuation profile forces radar designers to choose between long range at low resolution, or short range at high resolution. In an extreme example, penetrating radars such as foliage penetrating radar (FOPEN) or ground penetrating radar (GPR) require low frequencies to minimize attenuation within the penetrated medium. Consequently, only the very largest objects can be resolved, diminishing the utility of such radar systems.

Conventional ocean SOund NAvigation and Ranging (SO-NAR) sensor systems can be either passive or active. Passive SONAR is restricted to receiving signals, while active SONAR both transmits and receives signals. Active SONAR operates by transmitting a beam of sound waves through water. Sound waves travel faster through water than through air, and more rapidly through salt water than through fresh water. Target detection occurs when this beam encounters an object having different density than that of the medium through which the SONAR beam is being transmitted (sea water). The beam then bounces off the target and may be detected by receivers positioned to receive the reflected beam.

Active SONAR is extremely useful in that it gives the exact position of a target, but it also has some significant drawbacks. Active SONAR is noisy, and can be easily detected through passive SONAR near the emitting SONAR. Furthermore, the resolution characteristics of active SONAR do not allow for the exact identification of the target. In addition, active SONAR may operate at frequencies over which marine life is sensitive.

Ultrasound systems provide images of muscles, tendons, and many internal organs, their size, structure and any pathological lesions with real time tomographic images. Ultrasound is commonly used to visualize a fetus during routine and emergency prenatal care. Although generally believed to be safer than ionizing radiation, some of the known effects of ultrasonic energy are enhanced inflammatory response and soft tissue heating. Thus, there is some concern that prolonged exposure to ultrasonic energy can affect tissue health and development.

According to concepts of quantum mechanics, a quantum system may exist in several states simultaneously corresponding to different values of a physical observable such as position, momentum, or spin. Changes among properties of entangled quanta can be correlated. The composite system is described by a state, that is, a topological structure of sub-states describing specific observables. Each of these states corresponds to eigenvalues of some set of observables (e.g., quanta positions). In quantum entanglement, the quantum states of two or more quanta are described with reference to each other, even though the individual objects may be spatially separated.

SUMMARY

It is thus desirable to provide a sensor system capable of using long wavelengths for propagation range combined with short wavelengths to resolve small objects.

In some embodiments, a sensor system comprises an entangled quantum generator operable to generate an entangled quanta signal including a plurality of entangled quanta. A carrier signal generator generates a carrier signal that includes electromagnetic field (EMF) pulses. The power of the carrier signal is less than the power required to ionize a propagating medium through which the carrier signal is traveling. A beam combiner is configured to output a combined signal that includes the entangled quanta signal in an EMF pulse of the carrier signal. A quantum detector is configured to detect a return signal based on the combined signal being reflected by a target.

BRIEF DESCRIPTION OF THE FIGURES

Embodiments of the present invention may be better understood, and their numerous objects, features, and advantages made apparent to those skilled in the art by referencing the accompanying drawings. The use of the same reference symbols in different drawings indicates similar or identical items.

DETAILED DESCRIPTION

Embodiments of systems and methods for sensor systems using entangled quanta, referred to as quantum sensors, are disclosed herein. Entangled beams allow the absorption spectrum and the resolution limit of quantum sensor systems to be selected independently of one another. Thus, while classical sensor systems such as radar and sonar systems must compromise between range and resolution, quantum sensor systems can simultaneously achieve the low attenuation/high range associated with a long wave length and the high resolution associated with a short wave length.

As used herein, the term "quantum sensor system" refers to systems that use entangled beams at radio and/or audio frequencies. The terms "quantum" and "quanta" refer to photon(s) for radio frequency waves and/or phonon(s) for audio frequency waves. The wavelength of two or more entangled quanta, referred to as a multiquanta, is proportional to the number of entangled quanta associated with the multiquanta. For example, the wavelength of a pair of entangled quanta is twice that of the single quanta. The wavelength of three entangled quanta is three times that of the single quanta. For a foursome, the difference is a multiple of 4, and so on. It is also possible to entangle two or more quanta of different wave lengths where absorption wavelength of the signal is the, then, the sum of wavelengths of the constituent quanta.

A measure of performance for classic sensor systems is the signal to noise (S/N) ratio, which is directly proportional to the frequency of the quanta. The higher the frequency, the higher the S/N ratio and, typically, the system performance.

Waves traveling at certain frequencies are absorbed in a medium when the wavelength of propagating quanta is resonant with molecules in the medium, such as water molecules in air. Classical radar systems are typically limited to microwave frequencies due to absorption, leaving the far-infrared frequencies largely unused. In classical sonar systems, the most effective propagation waves are often at frequencies that cause harm to marine life that use sonar to detect predators and prey. Entangling quanta into multiquanta changes their resonance behavior and "detunes" them with respect to the absorption bands. Entangled waves can combine one or more quanta with a relatively high frequency for resolution with one or more quanta at a lower frequency for more effective propagation through various absorption bands in the atmosphere, water, or other medium. The frequencies of the waves for propagation and resolution can be separately controlled, allowing the quantum sensor system to use signals for resolution at previously unused or less harmful frequencies. Thus, quantum sensor systems are typically capable of providing information about targets that cannot be provided using classical sensor systems.

In classical sensor systems, return signal energy is proportional to the density of radiation power emanating from the antenna ($P_{avg}$), spectral cross-section of the target ($\sigma$), area of aperture ($A_{eqv}$) (assuming receive and transmit antennas are the same size), and time on target ($t_{tot}$); and is inversely proportional to the distance to the target (R), the wavelength of the signal ($\lambda$), and a loss factor (L), as shown by the following equation:

$$\text{Signal Energy} = \frac{P_{avg} A_{eqv}^2 \sigma t_{tot}}{4\pi R^4 \lambda^2 L}$$

To determine the return signal energy for a quantum sensor system, let c denote the speed of light, h denote Planck's constant, $E_{ef}$ denote the energy per entangled quanta of frequency $\omega_{ef}$, $N_{efpmf}$ the number of entangled quanta per multiquanta, and $N_{mf}$ the number of multiquanta per second. The wavelength associated with the entangled quanta is determined using the deBroglie equation:

$$\lambda_{ef} = \frac{hc}{N_{efPmf} E_{ef}}$$

$$E_{ef} = h\omega_{ef} = hc/\lambda_{ef}$$

$$P_{avg} = E_{ef} N_{efPmf} N_{mf}/t_{tot}$$

then substituting the above terms into the classical radar/sonar signal energy equation, the signal energy for a quantum sensor system is given by:

$$\text{Signal Energy}_{QR} = \frac{hc}{4\pi} N_{mf} \left( \frac{A_{eqv}^2 \sigma}{R^4 L} \right) \left( \frac{N_{efPmf}}{\lambda_{ef}} \right)^3$$

Thus, the signal energy of a sensor system using entangled quanta is proportional to the cube of the number of entanglement quanta per multiquanta. Note that the effective wavelength $\lambda_{ef}$ is inversely proportional to the number of entangled quanta in a multiquanta. As a result, the return signals from the individual quanta can be used to achieve high target resolution while the wavelength of the multiquanta can be designed for effective propagation through the subject medium.

Range resolution in conventional sensor systems is inversely proportional to the pulse width of the waveform generator signal. One technique to improve resolution despite the Rayleigh limit is referred to as "pulse compression", which compresses a long pulse temporally while maintaining the total energy of the pulse. Increased resolution is achieved at a cost of less image data per unit time.

Another technique to improve resolution despite the Rayleigh limit includes increasing the length scale of the aperture by using travel distance over a period of time to create a "synthetic" aperture. Synthetic Aperture Radar (SAR) systems increase resolution at the cost of extending the time required to collect an image. As a result, a reduced number of images can be collected in a given interval.

While increasing resolution in quantum sensor systems requires an increase in energy per pulse, the penalty of longer exposure time is not incurred, as in classical sensor systems that use techniques such as pulse compression and synthetic aperture. In military systems, longer exposure time increases the risk of the signal being detected. Note, however, that the time on target $t_{tot}$ cancels out of the signal energy equation for quantum sensor systems, offering the advantages of high resolution, with lower probability of the signal being detected in tactical situations, compared to classical sensor systems. According to the radar/sonar equation, a quantum sensor system can focus more energy on the target per unit of aperture per unit time and extract more information than a comparable classical sensor system.

One limitation in classical sensor systems is that the ratio of imaging rate to resolution is fixed such that searching for and tracking targets cannot be accomplished simultaneously. Different sensor systems, or complex sensor systems capable of operating in interleaved modes, are required to detect ground, air, and underwater moving targets. With quantum sensor systems, however, the imaging rate to resolution ratio can be selected for simultaneous targeting, tracking, and synthetic aperture imaging. Additionally, multiquanta in multiple frequency ranges can be generated dynamically to propagate through different mediums and resolve different types of targets.

Figure 1:
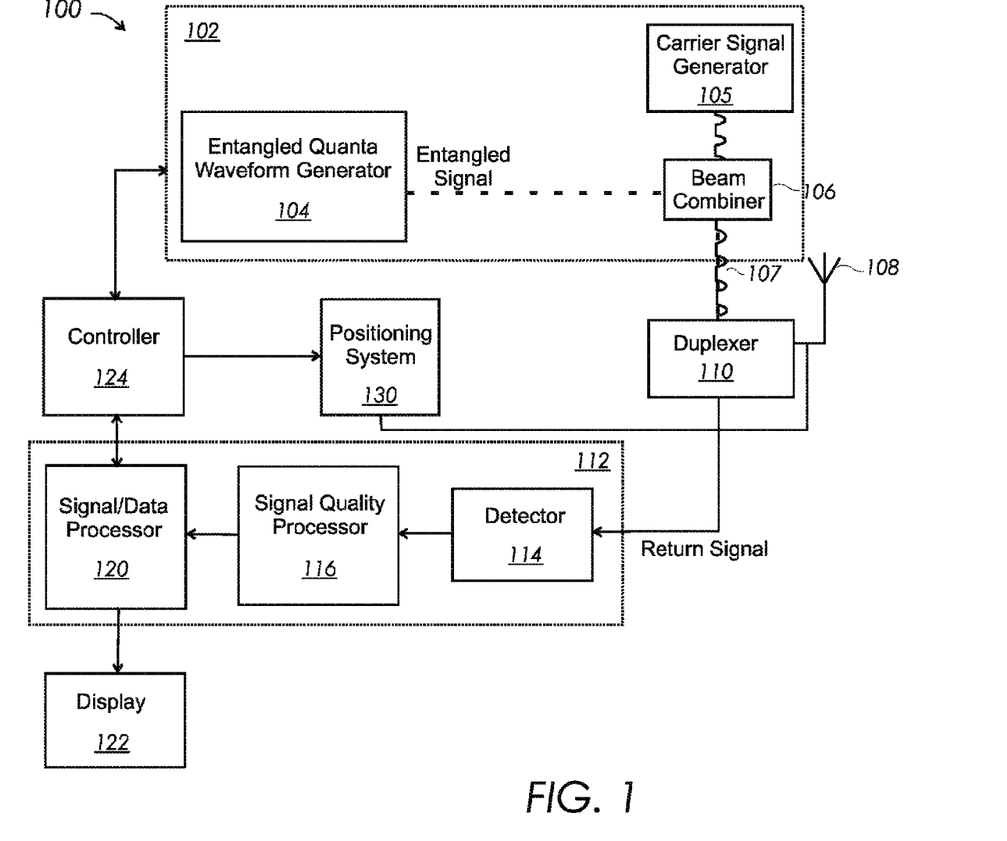
FIG. 1 is a schematic diagram of an embodiment of a quantum sensor system.

Referring to FIG. 1, a diagram of an embodiment of quantum sensor system 100 is shown including transmitter section 102 with entangled quantum waveform generator 104, carrier signal generator 105, and beam combiner 106.

Figure 2:
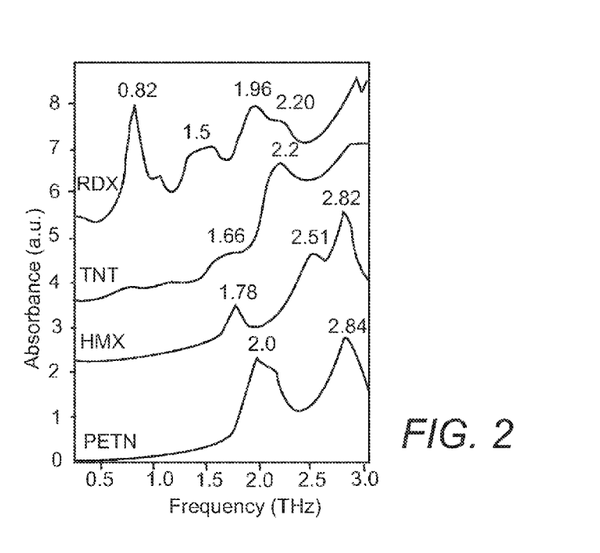
FIG. 2 shows absorbance versus frequency plots of the terahertz absorption spectrum for exemplary substances.

Sensor system 100 can be used to detect various substances. In some implementations, terahertz radiation (1 THz=1012 Hz) of entangle quanta output by waveform generator 104 is well-suited to detect chemical and biological agents like poisons and explosives. FIG. 2 shows absorbance versus frequency plots of the terahertz absorption spectrum of Cyclotrimethylenetrinitramine (RDX), Trinitrotoluene (TNT), Octogen (HMX), and Pentaerythritol tetranitrate (PETN) in which each chemical is clearly distinguishable. (FIG. 2 is presented in Hai-Bo Liu, Hua Zhong, N. Karpowicz, Yunqing Chen, and Xi-Cheng Zhang, Terahertz Spectroscopy And Imaging For Defense And Security Applications, Proceedings of the IEEE, 95(8):1514-1527, August 2007.) Terahertz radiation is strongly absorbed by water vapor, however, making standoff sensing of substances difficult in all but the driest of climates.

Waveform generator 104 can be configured to generate single quanta and/or multiquanta waveforms using a variety of different techniques and devices such as one or more photonic modules, atom cavities, quantum dots, Bose-Einstein condensates as well as other suitable devices for generating entangled quanta. One approach to quantum waveform generation involves entangling one degree of freedom of the quanta such as a spin. If a disturbance in the environment changes the state of the quanta, the waveform may become decoherent. For example, water molecules in a propagating medium such as air may absorb particles in the entangled quanta waveform, thereby destroying the entanglement between the quanta.

Figure 3:
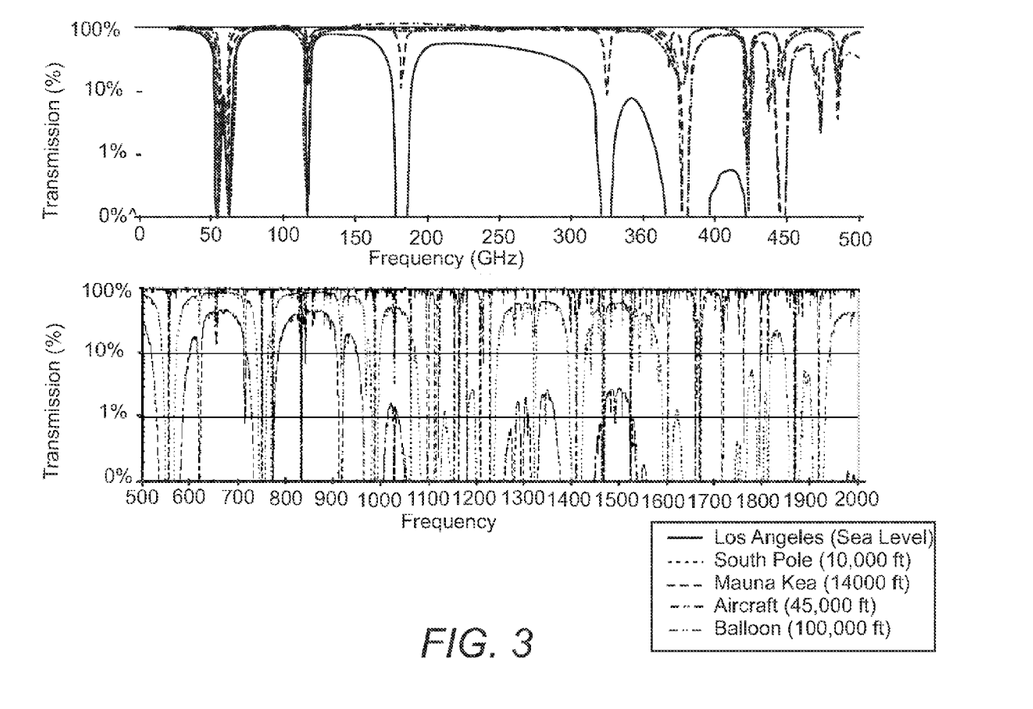
FIG. 3 shows exemplary plots atmospheric transmission as a function of radiation frequency for several altitudes and locations.

FIG. 3 shows atmospheric transmission as a function of radiation frequency, for several altitudes and locations. (FIG. 3 is presented in P. H. Siegel, Terahertz Technology, Microwave Theory and Techniques, IEEE Transactions on, 50(3): 910-928, March 2002.) Below 300 GHz the atmosphere is transparent, apart from a few widely spaced absorption bands. Above 300 GHz, absorption features become stronger and more densely packed, especially at frequencies higher than 1 THz. Since this frequency region is also where FIG. 2 shows many interesting absorption features, atmospheric transmission can be a serious problem for terahertz remote sensing.

Atmospheric absorption of terahertz radiation is primarily due to rotational absorption by water molecules. Water molecules have a permanent dipole moment, and at room temperature, they rotate at terahertz frequencies. Each rotating molecular dipole acts as a resonant antenna for absorbing and dispersing terahertz radiation.

Figure 4:
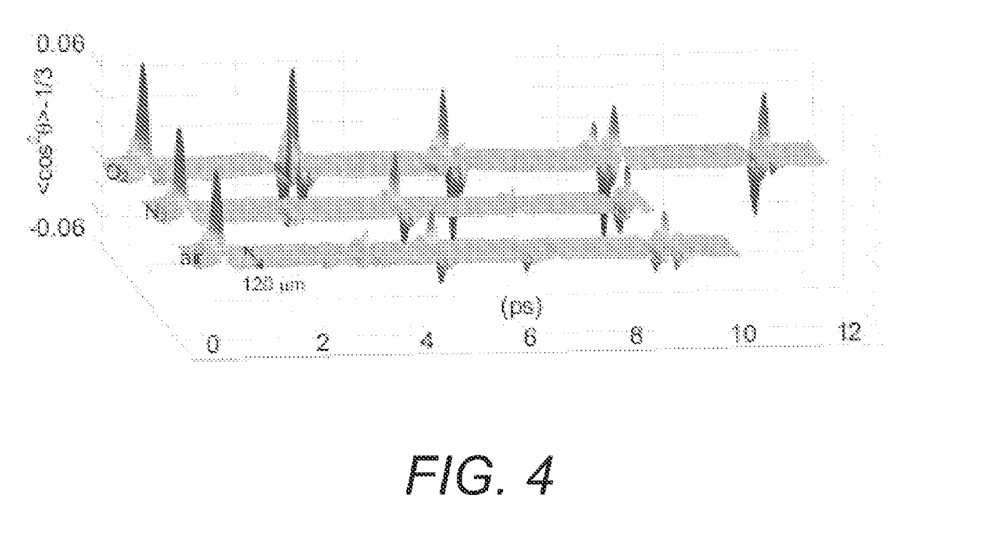
FIG. 4 shows that intense short pulses of linearly polarized visible radiation can produce both coherence (lining up molecules with each other) and energy exchange through population transfer (speeding up or slowing down molecular rotation, on average).

Intense short pulses of linearly polarized visible radiation can influence molecular rotation. As shown in FIG. 4, the intense short pulses of linearly polarized visible radiation can produce both coherence (lining up molecules with each other) and energy exchange through population transfer (speeding up or slowing down molecular rotation, on average). (FIG. 4 is presented in Y.-H. Chen, S. Varma, A. York, and H. M. Milchberg, Single-Shot, Space And Time-Resolved Measurement Of Rotational Revivals In H-2, D-2, N-2, O-2, And N2O, Optics Express, 15(18):11341-11357, Sep. 3, 2007.) In FIG. 4, the lining up of molecules is shown as a series of pulses.

Figure 5:
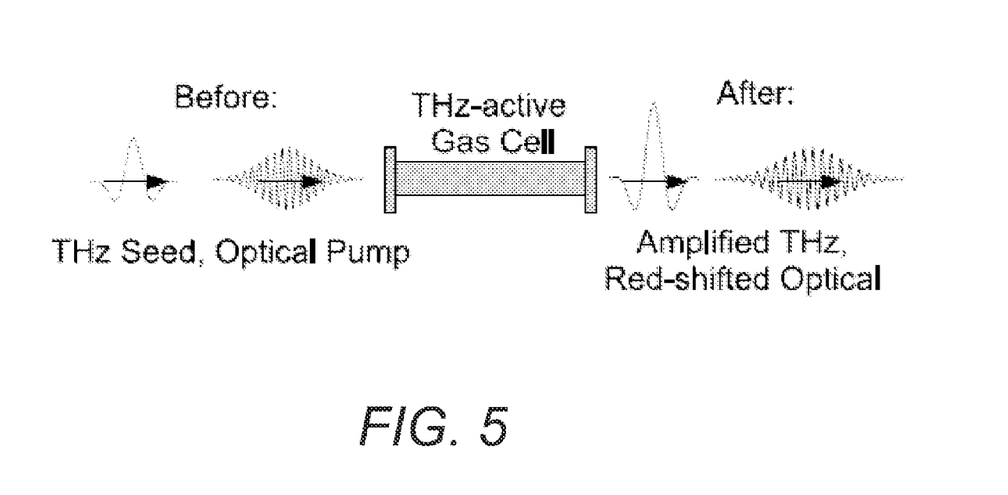
FIG. 5 shows an example of an optical pulse being used to drive the water vapor into a state with amplified terahertz radiation.

Since an intense optical pulse can drive water vapor into a rotational state which is transparent to terahertz radiation, system 100 combines a terahertz pulse from waveform generator 104 with an optical pulse from carrier wave generator 105 to travel to a distant target without absorption. Additionally, the optical pulse can drive the water vapor into a state that amplifies terahertz radiation, as illustrated in FIG. 5. (FIG. 5 is presented in Andrew G. York and H. M. Milchberg, Broadband Terahertz Lasing In Aligned Molecules, Optics Express, 16(14):10557-10564, Jul. 7, 2008.)

Substantial population transfer has been predicted to reduce or eliminate terahertz absorption by a dipolar gas, and even to turn absorption into amplification. However, population transfer requires high laser intensity near the ionization threshold of most gases. Also, population transfer absorbs energy from the optical pulse, eventually depleting its energy.

Carrier signal generator 105 can be implemented with a laser that produces pulsed signals. In some embodiments, the pulse duration of the carrier signal can range from 10 to 0.1 femto seconds. The pulse energy is delivered in a very short period of time at relatively high power (e.g., $10^{15}$ to $10^{18}$ Watts), therefore, the energy of the carrier signal is lower than the energy required to ionize the propagating medium.

Coherence is a prerequisite for significant population transfer by short laser pulses, but not vice versa. Much less laser intensity is required to drive significant coherence than to drive significant population transfer. Coherence driven by optical pulses strongly affects how a gas of dipolar molecules absorbs terahertz radiation, even in the absence of population transfer. Unlike population transfer, driving coherence does not necessarily deplete energy from the optical pulse, since a coherent and an incoherent gas of molecules with the same rotational state populations has approximately the same total energy.

Coherence driven by optical pre-alignment can substantially reduce (or enhance) terahertz absorption in a frequency-tunable fashion. This tunable absorption can be used to reduce terahertz absorption by atmospheric water vapor, enhancing remote sensing of poisons, explosives, and other substances.

Optically driven coherence significantly influences coherent re-radiation and can amplify co-propagating terahertz radiation, even without optically-driven population transfer. Unlike population transfer, optically driven coherence doesn't consume energy from the optical pulse, the coherence merely redshifts the pulse. Optically driven population transfer is proportional to the square of the optical intensity, but coherence is simply proportional to intensity, so coherence can be selectively excited with vanishing population transfer, and therefore nearly no energy deposited by the optical pulse. Coherence in the absence of population transfer can amplify terahertz radiation and represents conversion of coherence directly to energy.

Optical pre-alignment can reduce the total prompt absorption of a single-cycle terahertz pulse by more than 30%, and amplify selected frequencies. Coherent re-radiation power can also be enhanced, for example, by a factor of >25.

Molecular coherence also has a lensing effect on a trailing optical pulse. With neither absorption nor diffraction limiting the long-distance atmospheric propagation of terahertz pulses, terahertz standoff applications like remote sensing or communication with a low probability of intercept are practical.

Accordingly, system 100 for terahertz sensing can include carrier signal generator 105 to generate an optical pulse carrier signal. Beam combiner 106 combines the carrier signal with the entangled quanta signal to provide combined signal 107 to duplexer 110 for output to antenna 108. Beam combiner 106 can be implemented with a half-silvered mirror or other suitable device capable of combining the carrier signal with the entangled quanta signal so that the entangled quanta coincide with the pulses of the carrier signal.

In some embodiments, signals are both transmitted and received via antenna 108. In such embodiments, duplexer 110 switches to provide a signal from beam combiner 106 to antenna 108 during transmit mode. Note that in other embodiments, different and/or multiple antennas 108 can be used for transmit and receive functions.

Receiver section 112 typically includes detector 114, signal quality processor 116, and signal/data processor 120. The sensor data generated by processor 124 as images and/or other suitable format can be provided to display 122 as well as other output devices such as a printer or storage media. Waveform generator 104 and signal/data processor 120 interface with controller 124. Controller 124 can provide signals to positioning system 130, which adjusts the direction in which radar beams are transmitted and received to provide improved information regarding a target.

Figure 6A:
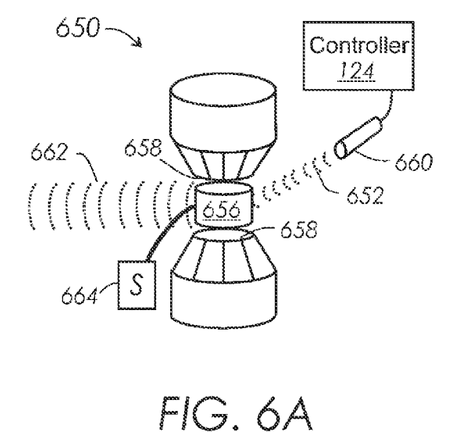
FIG. 6A is a diagram of an embodiment of an atomic cavity waveform generator that can be used in the sensor system of FIG. 1.

FIG. 6A shows an embodiment of atom cavity 650 in which one or more energy beams 652 are directed to one or more atoms trapped in an enclosed cavity 656 formed by a field between two superconducting mirrors 658. One or more devices 660 capable of generating an energy beam 652, such as a laser, maser, ultrasonic, and/or any other type of energy beams, can be used to accelerate or decelerate electrons in atoms in cavity 656, thereby generating a signal 662 composed of multiple entangled quanta. Controller 124 can be configured to control operation of energy beam device 660 to generate entangled quanta at the frequencies desired to detect one or more characteristics of a target.

Figure 6B:
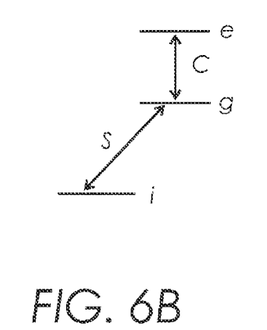
FIG. 6B is a diagram showing the energy levels for the atomic cavity waveform generator of FIG. 6A.

An example of an atom cavity 656 capable of generating multiple entangled quanta is described in "Step-by-Step Engineered Multiparticle Entanglement" by Arno Rauschenbeutel, Gilles Nogues, Stefano Osnaghi, Patrice Bertet, Michel Brune, Jean-Michel Raimond, and Serge Haroche, Science Magazine, Vol. 288, Jun. 16, 2000, (hereafter referred to as "Rauschenbeutel" and incorporated by reference herein). FIG. 6B shows the relevant atomic levels e, g, and i of atoms in cavity 656. Atoms emitted by energy beam devices 660 are prepared in e or g atomic levels. The atoms cross cavity 656 resonant at frequency C on the e→g transition. Classical Rabi pulses at frequency S from pulse generator 664 can be applied on the atoms before and after they interact with cavity 656 to perform programmed transformations on each atomic state. The term Rabi pulses refers to an atom that cyclically absorbs and re-emits quanta at resonance when illuminated by a coherent beam of quanta.

A static electric field applied across mirrors 658 is used to control the atomic transition frequency through the Stark effect, which refers to the shift in, and broadening of, the spectral line structure of matter in the presence of an electric field. The residual quantum number increases at the end of the sequence. The position of an atom can be determined with a precision that allows each atom to be addressed independently. The joint atom-quantum state manipulations rely on the resonant quantum Rabi rotation experienced by each atom in cavity 656. Atom cavity system 650 undergoes oscillations between the states $|e,0\rangle$ and $|g,1\rangle$ (atom in e or g with either zero or one quanta). The full effective atom cavity interaction time corresponds to a $2\pi$ Rabi pulse. Shorter interaction times are obtained by using the Stark effect to switch the atomic transition away from cavity resonance at preset times. An entangled state is achieved by combining Rabi pulses of various durations on successive atoms.

Figure 7A:
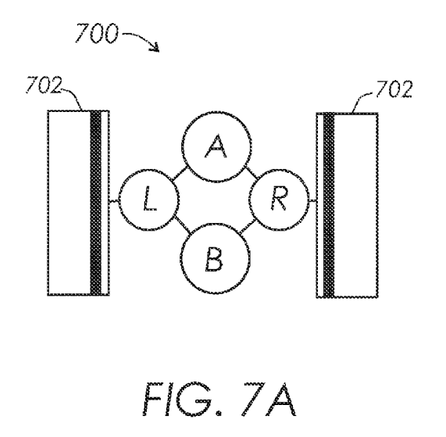
FIG. 7A is a diagram of another embodiment of a waveform generator that can be used in the sensor system of FIG. 1.
Figure 7B:
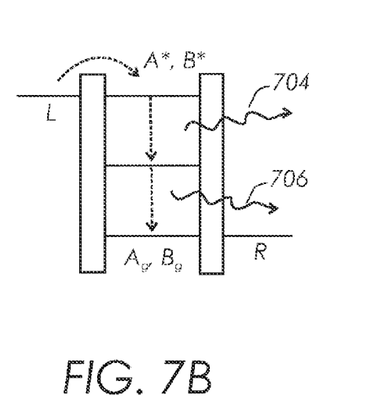
FIG. 7B is a diagram showing the energy levels for the waveform generator of FIG. 7A.

Referring now to FIGS. 7A and 7B, another embodiment of a waveform generator 700 configured to generate multiquanta waveforms using quantum dots (A, B, L, R) that can be used in sensor system 100 is shown. Quantum Dots (QDs) are very small semiconductor structures on the order of nanometers or somewhat larger in diameter that confine electrons and holes in three spatial dimensions and to a very small number of energy levels, depending on their size. A QD is larger than an atom but behaves as if it were one, releasing its trapped electron-hole pair to an adjacent conductor when it captures an incident quantum.

A publication entitled "Entangled Microwaves From Quantum Dots" by C. Emary, B. Trauzettel, and C. W. J. Beenakker, Instituut-Lorentz, Universiteit Leiden, P.O. Box 9506, 2300 RA Leiden, The Netherlands, (Feb. 23, 2005) (referred to herein as "Emary" and incorporated by reference herein) discloses examples of techniques for producing polarization-entangled microwaves using intra-band transitions in a pair of quantum dots. The techniques do not rely on spin-orbit coupling or on control over electron-electron interactions. The quantum correlation of microwave polarizations is obtained from orbital degrees of freedom in an external magnetic field.

FIG. 7A shows four quantum dots A, B, L, R, arranged between two electron reservoirs 702. In the embodiment shown, quantum dot L is coupled to one of electron reservoirs 702 and quantum dots A and B, as discussed in Emary. Quantum dot R is coupled to the other electron reservoir 702 as well as quantum dots A and B. There is no direct coupling between quantum dots L and R, or A and B.

FIG. 7B shows the positions of quantum dot levels for quantum dots A, B, L, R. An electron tunnels through the single level in dot L into a superposition $\alpha|A^*\rangle+\beta|B^*\rangle$ of upper levels in dots A and B. The electron decays to the ground state with the emission of two quanta. The resulting state $\alpha|A_g\rangle++\rangle\beta|B_g\rangle--\rangle$ encodes the state of the quantum dot L onto pairs of quanta with left or right circular polarization. Subsequent tunneling of the electron out of the lower levels into quantum dot R establishes a unique final state for the electron, thus separating the quantum dot field wave function and liberating a pair of entangled quanta 704, 706.

Figure 7C:
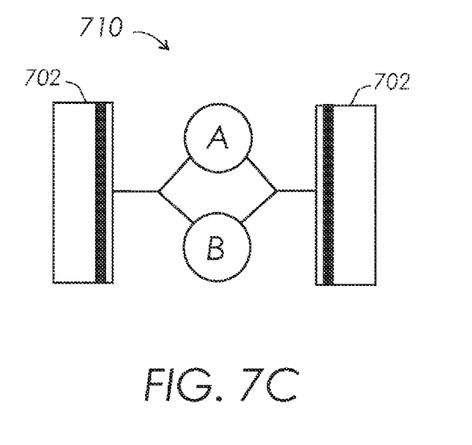
FIG. 7C is a diagram of an alternate embodiment of the waveform generator of FIG. 7A.

FIG. 7C shows another embodiment of a waveform generator 710 configured to generate multiquanta waveforms using only two dots, with dots L and R being replaced by Y-junction connections. The quantum dots A and B are connected to within a Fermi wavelength of each other at the Y-junctions to ensure that an electron tunnels coherently into both quantum dots A and B, as further described in Emary.

Figure 7D:
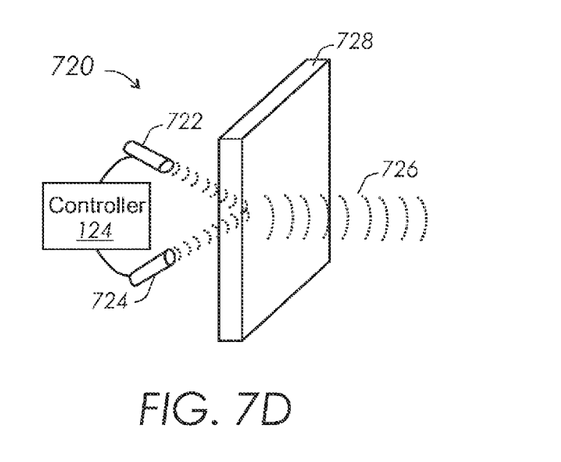
FIG. 7D is a diagram of an alternate embodiment of the waveform generator of FIG. 7A.

Another publication entitled "Creating Excitonic Entanglement In Quantum Dots Through The Optical Stark Effect" by Ahsan Nazir, Brendon W. Lovett, and G. Andrew D. Briggs, Department of Materials, Oxford University, Oxford OX1 3PH, United Kingdom, Nov. 3, 2004, and incorporated by reference herein, discloses that two initially non-resonant quantum dots may be brought into resonance by the application of a single detuned laser. In some systems, such as an embodiment of system 720 shown in FIG. 7D, one laser 722 can be used to trigger or generate the quanta, and another laser 724 can be used to couple the emitted quanta in an entangled RF wave 726. Note that some embodiments can include an array 728 of quantum dots and triggering and coupling lasers 722, 724. A corresponding number of additional lasers 722, 724 can be used to generate more than two entangled quanta.

Figure 8:
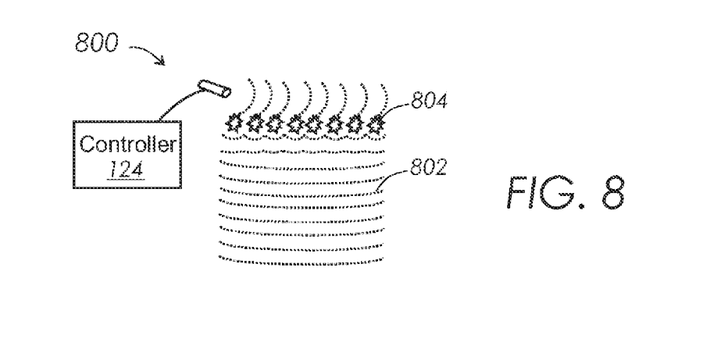
FIG. 8 is a diagram of another embodiment of a waveform generator that can be used in the sensor system of FIG. 1.

Referring now to FIG. 8, another embodiment of waveform generator 800 configured to generate multiquanta waveforms 802 using Bose-Einstein condensates (BECs) 804 that can be used in sensor system 100 is shown. BECs 804 are comprised of a group of atoms that exist in exactly the same state. Methods to produce entangled states of several quanta from a BEC 804 are described in "Many-Particle Entanglement With Bose-Einstein Condensates" by A. Sorensen, L.-M. Duan, J. I. Cirac & P. Zoll, Nature 409, 63 (2001), incorporated by reference herein, using atom-atom interactions and/or spin-exchange collisions to create entangled quanta in multiquanta waveforms 802. The publication "Creating Massive Entanglement of Bose-Einstein Condensed Atoms" by Kristian Helmerson and Li You, Physical Review Letters, Volume 87, Number 17, Oct. 22, 2001, incorporated by reference herein, further proposes using a Raman process that couples the atoms through intermediate molecular states to entangle a large number of quanta.

Note that other suitable methods for generating multi-quanta waveforms can be used in sensor system 100 in addition to, or instead of BECs 804, quantum dot systems 700, and atom cavity systems 200.

Referring again to FIG. 1, controller 124 can be configured to perform a modulating function by controlling a laser or other energy source in waveform generator 104 to transmit pulsed or continuous multiquanta waveforms. Additionally, waveform generator 104 can be controlled to vary one or more properties of successive entangled quantum waveforms so that either or both the frequency and the property of interest can be detected to correlate emitted and return signals.

Positioning system 130 can be operated by controller 124 in coordination with waveform generator 104 to achieve desired sensor beam shapes and to focus the emitted signal in a particular direction. The desired sensor beam shapes can be indicated by an automatically and/or manually actuated sensor mode switch coupled to provide input to controller 124.

Figure 9:
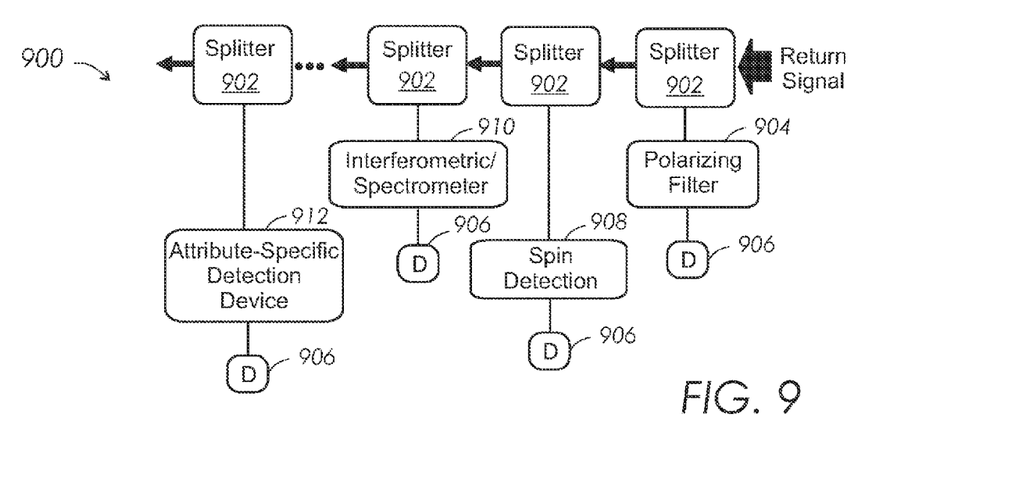
FIG. 9 is a diagram of an embodiment of a series of devices that can be used in the sensor system of FIG. 1 to detect various attributes of the entangled quanta in the return signal.

Referring now to FIGS. 1 and 9, FIG. 9 shows an embodiment of downconverter 900 that can be used in sensor system 100 in which the waveforms are not topologically ordered. The return signal is comprised of multiple entangled quanta, which are separated by a series of beam splitters 902. Since measuring an attribute of an entangled photon alters the attribute, the number splitters 902 included in detector system 900 depends on the number of attributes of the entangled quanta to be measured. In the embodiment shown, quanta deflected by the series of splitters 902 are input to corresponding attribute-specific detection devices 912, such as polarizing filter 904, spin detection device 908, and interferometer/spectrometer 910.

Polarizing filter 904 indicates the polarization of the quanta in the return signal and can be used to determine the direction of a target's velocity vector. Spin detection device 908, such as a Stern-Gerlach device, indicates the spin of the quanta in the return signal. The level of spin can be used to determine the magnitude of the target's velocity vector. Measurements from interferometer/spectrometer 910 can be used to determine the phase and analyze spectral properties of the quanta in the return signal. The phase angle can be used to determine azimuth and elevation of the target, as well as the Doppler shift of the return signal. Spectral analysis can be used to determine the material composition of the target. Other devices suitable to measure specific attributes of the quanta in the return signal can be used. Such a configuration allows entangled quanta to be separated and attributes to be measured independently of one another, that is, without affecting other attributes of the entangled quanta.

Figure 10:
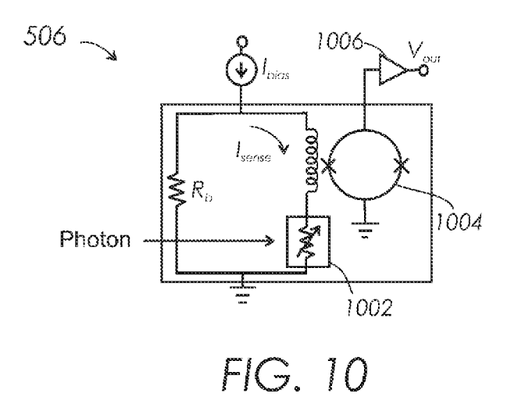
FIG. 10 is a diagram of an embodiment of a single quantum detector that can be utilized in the detector of FIG. 9.

A quanta detector 906 can be included with each attribute-specific detection device 912 to count the number of quanta with the detected attribute. The detected number can be used to determine a statistical estimate of the number of quanta in the return signal with that specific attribute. A schematic diagram representing an example of detector 906 capable of detecting single quantum is shown in FIG. 10 and described in a publication entitled "Demonstration Of A Low-Noise Near-Infrared Photon Counter With Multi-photon Discrimination," by Aaron J. Miller, Sae Woo Nam, John M. Martinis, and Alexander V. Sergienko, Applied Physics Letters, Volume 83, Number 4 (Jul. 28, 2003) and incorporated by reference herein. Note that detector 906 can be configured with a microphone to detect phonons instead of photons.

Detector 906 includes a superconducting absorbing material 1002 that uses transition edge sensor (TES) microcalorimeter technology to produce an electrical signal proportional to the heat produced by the absorption of a quantum from the return signal. Absorbing material 1002 can be configured as a metal film, such as tungsten, with very narrow superconducting-to-normal resistive transition characteristics. Applying a voltage across the metal film causes the film to self-bias in the resistive transition allowing its temperature to be determined by measuring the electrical current flow through the metal. The integral of the current pulse is proportional to the energy deposited in the absorbing material 1002 from the quantum in the return signal. The voltage bias for detector 906 is provided by current source ($I_{bias}$) and a shunt resistor ($R_b$). The detector signal $I_{sense}$ is amplified by one or more amplifiers 1004, such as an array of SQUID amplifiers, and processed with pulse shaping electronics 1006. Note that other suitable types of detectors 906 can be used.

A quanta detector 906 can be included with each attribute-specific detection device 912 to count the number of quanta with the detected attribute. The detected number can be used to determine a statistical estimate of the number of quanta in the return signal with that specific attribute. A schematic diagram representing an example of detector 906 capable of detecting single quantum is shown in FIG. 10 and described in a publication entitled "Demonstration Of A Low-Noise Near-Infrared Photon Counter With Multi-photon Discrimination," by Aaron J. Miller, Sae Woo Nam, John M. Martinis, and Alexander V. Sergienko, Applied Physics Letters, Volume 83, Number 4 (Jul. 28, 2003) and incorporated by reference herein.

Referring again to FIG. 1, the information available from attribute-specific detection devices 912 (FIG. 9) can be provided to signal quality processor 116. Signal quality processor 116 can filter noise out of the signals, and perform other functions to condition the signals to provide the most information available to signal data processor 120. In some embodiments, signal quality processor 116 can measure the fidelity of the return signal and distinguish the return signal from noise using a lattice or other suitable structure.

Signal/data processor 120 coherently combines the pulses within each return signal to obtain a sharpened image that can be presented on display 122. Image analysis logic can be included in signal processor 120 to determine the type of target(s) shown in the image, as well as to determine speed, direction, number, and other attributes of the target(s).

Components in quantum sensor system 100 can be embodied in any suitable device(s) using any suitable combination of firmware, software, and/or hardware, such as microprocessors, Field Programmable Gate Arrays (FPGAs), Application Specific Integrated Circuit (ASICs), quantum computers, or other suitable devices.

The ability to propagate sensor signals at frequencies that are independent of the resolution frequency may allow quantum sensor system 100 to attain near zero attenuation rates in the propagation medium, and greatly diminished attenuation rates in other media including foliage, building materials, earthen layers, etc. Quantum sensor system 100, thus, can be adapted to visualize useful target details through background and/or camouflaging clutter, through plasma shrouds around hypersonic air vehicles, through the layers of concealment hiding underground facilities, IEDs, mines, and other threats—all while operating from an airborne, waterborne, or other suitable platform. Quantum sensor system 100 may also improve the performance of advanced image processing and pattern recognition systems, as well as defeat most signature management systems when the propagation frequency is tuned to the resonant wave length of the target.

Figure 11:
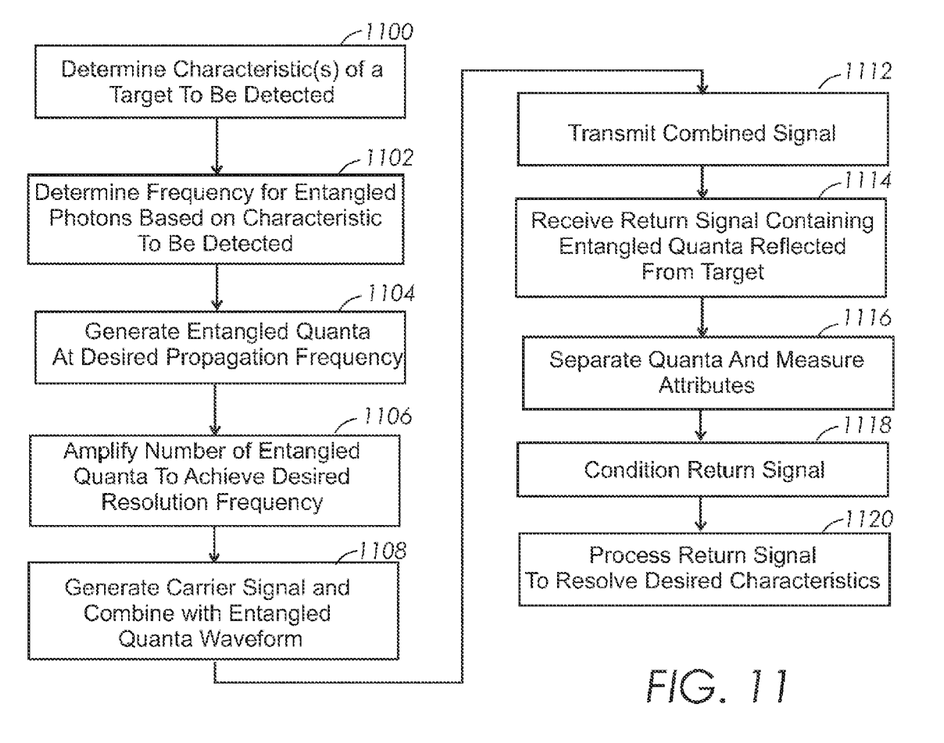
FIG. 11 is a flow diagram of an embodiment of a process for generating a signal comprising entangled quanta and receiving a return signal comprising the entangled quanta reflected from a target that can be utilized in the sensor system of FIG. 1.

FIG. 11 is a flow diagram of an embodiment of a process for generating a signal comprising entangled quanta and receiving a return signal comprising the entangled quanta reflected from a target that can be utilized in the sensor system 100 of FIG. 1. Process 1100 can include determining one or more characteristics of target(s) to be detected. The characteristics can include distance, azimuth and elevation, material composition, type of target, high/medium/low resolution images, traveling speed and direction, and other suitable characteristics. One or more mode selection switches can be provided for an operator to dynamically select one or more of the characteristics to be detected. Further, components in sensor system 100 such as controller 124 can be configured to automatically add and/or switch modes based on the operating mode(s) of other devices, such as aircraft, watercraft, space platform, or other device, with which sensor system 100 can be utilized.

Process 1102 can include determining wavelength/frequency for the entangled quanta based on characteristic(s) to be detected. For example, if detailed images of the target(s) are desired, process 1102 determines a suitable wavelength and corresponding frequency for the quanta based on the characteristic to be detected. The desired frequency/wavelength can be adjusted automatically based on operational mode of the sensor system 100.

Different frequencies can be used for different propagation mediums such as air, water, vacuum, foliage, ground, and buildings. Process 1104 includes generating the entangled quanta(s) at the desired propagation frequency once the propagation medium is provided or determined. For example the propagation medium can be provided manually through operator input or determined automatically based on sensor data and/or image analysis. Various types of sensors can be used to detect whether the sensor beams are propagated through air, water, buildings, foliage, or other mediums (or combination of mediums). Once the propagation medium is known, a suitable propagation frequency can be determined.

If the waveforms are propagated through a combination of mediums, controller 124 can include logic to determine the most suitable frequency, or weighted average of propagation frequencies to use.

Process 1106 can include amplifying the number of entangled quanta used in the sensor beam required to achieve the desired resolution frequency. Process 1106 can increase the number of quanta, but the frequency of the quanta will be lowered by a factor proportional to the increased number. Thus, changing the resolution frequency has little or no effect on the propagation frequency since the propagation frequency is the sum of the frequencies of the individual quantum.

Process 1110 can include generating a carrier signal, for example, a pulsed laser signal, and generating a combined signal that includes the entangled quanta and the carrier signal. The carrier signal includes electromagnetic field pulses and the entangled quanta are transmitted in the pulses. The power of the carrier signal is less than the power required to ionize a propagating medium through which the carrier signal is traveling.

Process 1112 includes transmitting the entangled quanta waveform in a radio-frequency signal, which is typically accomplished using antenna 108.

Process 1114 includes receiving and detecting at least a portion of the entangled quanta reflected by a target. In some embodiments, process 1116 can separate one or more quanta from the return signal by passing the return signal through a beam splitter. The return signal can pass through a series of beam splitters, and a single attribute or characteristic can be measured from each of the split signals. Note that measuring a particular attribute of entangled quanta will change the attribute. Process 1114 thus allows each attributes/characteristics of interest to be measured without disturbing or changing the other attributes/characteristics.

Process 1118 can perform one or more techniques to condition the return signal for further processing. In some embodiments, one or more filters can be used to remove noise components from the return signal. Alternatively or additionally, one or more amplifiers can be used to increase desired frequencies or other properties of the return signal. Other suitable conditioning techniques to facilitate gathering information from the return signal can be utilized in process 1116.

Process 1120 includes determining a characteristic of the target based on interaction between the target and the entangled quanta. For example, the direction of a radar target's velocity vector can be determined from the polarization of the quanta in the return signal. The level of spin can be used to determine the magnitude of the target's velocity vector. The phase angle can be used to determine azimuth and elevation of the target, as well as the Doppler shift of the return signal. Spectral analysis can be used to determine the material composition of the target. Information from other measured attributes of the quanta in the return signal can be determined in process 1120.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. Additionally, limitations set forth in publications incorporated by reference herein are not intended to limit the scope of the claims. In the claims, unless otherwise indicated the article "a" is to refer to "one or more than one".

We claim:

1. A sensor system comprising:
   an entangled quantum generator operable to generate an entangled quanta signal including a plurality of entangled quanta;
   a carrier signal generator operable to generate a carrier signal that includes electromagnetic field (EMF) pulses, the power of the carrier signal is less than the power required to ionize a propagating medium through which the carrier signal is traveling;
   a beam combiner configured to output a combined signal that includes the entangled quanta signal in an EMF pulse of the carrier signal; and
   a quantum detector configured to detect a return signal based on the combined signal being reflected by a target.

2. The apparatus of claim 1, further comprising:
   an attribute-specific detection device configured to determine a characteristic of the target based on information derived from at least one of the plurality of entangled quanta in the return signal, the frequency of the signal is selected to propagate the signal through a medium and the frequencies of the plurality of entangled quanta is selected so that the characteristic of the target can be resolved from the return signal.

3. The apparatus of claim 2, further comprising the characteristic of the target includes at least one of the group consisting of: location, speed, direction of travel, distance to target, target image, target size, target area, target volume, target dimension(s), target cross-section, target surface roughness, and target material composition.

4. The apparatus of claim 1, further comprising the entangled quantum generator is operable to vary the frequencies of the plurality of entangled quanta.

5. The apparatus of claim 1, further comprising the entangled quantum generator utilizes at least one of the group consisting of: a photonic module, quantum dots, Bose-Einstein condensates, and an atom cavity, to generate the entangled quanta.

6. The apparatus of claim 1, further comprising the entangled quantum generator is operable to vary the number of the plurality of entangled quanta included in the entangled quanta signal.

7. The apparatus of claim 1, further comprising:
   duration of the EMF pulses ranges between 10 and 0.1 femto seconds.

8. The apparatus of claim 1, further comprising:
   the beam combiner is a half-silvered mirror.

9. The apparatus of claim 1, further comprising the carrier signal is an optical signal.

10. The apparatus of claim 1, further comprising a positioning system operable to steer an antenna to radiate the combined signal in a desired direction and/or to detect the return signal from a desired direction.

11. The apparatus of claim 1, further comprising a duplexer configured to switch operation between transmitting the combined signal and receiving the return signal.

12. The apparatus of claim 1, further comprising the signal/data processor is operable to determine distance to the target based the time the combined signal is emitted and the return signal is detected.

13. The apparatus of claim 1, further comprising a beam splitter configured to separate at least one quanta from the return signal and provide the at least one quanta to the attribute-specific detection device.

14. The apparatus of claim 1, further comprising a plurality of attribute-specific detection devices and a series of beam splitters, the beam splitters are configured to separate at least one quanta from the return signal and provide the at least one quanta to a corresponding one of the attribute-specific detection devices.

15. A method comprising:
   generating a plurality of entangled quanta;
   generating a carrier signal;
   generating a combined signal that includes the entangled quanta and the carrier signal;
   transmitting the combined signal, wherein the frequency of the signal is selected to propagate through a particular medium and the number of the entangled quanta is determined by the selected frequency of the signal; and
   detecting at least a portion of the entangled quanta reflected by a target.

16. The method of claim 15, further comprising:
   selecting the frequency of the transmitted entangled quanta to optimize target resolution achievable by detecting the entangled quanta reflected by the target.

17. The method of claim 15, further comprising:
   selecting an attribute of the quanta to be entangled based on a characteristic of the target to be detected.

18. The method of claim 15, further comprising:
   determining a characteristic of the target based on interaction between the target and the entangled quanta.

19. The method of claim 15, further comprising:
   the carrier signal includes electromagnetic field pulses and the entangled quanta are transmitted in the pulses.

20. An apparatus comprising:
   means for generating a plurality of entangled quanta;
   means for generating a pulsed carrier signal, the energy of the pulsed carrier signal is less than the energy required to ionize the medium through which the carrier signal propagates;
   means for combining the entangled quanta within a pulse of the pulsed carrier signal; and
   means for transmitting the entangled quanta to a target, the frequency of the quanta is selected based on the target to be detected and the number of entangled quanta is based on the medium through which the entangled quanta will propagate.

* * * * *

UNITED STATES PATENT AND TRADEMARK OFFICE
CERTIFICATE OF CORRECTION

PATENT NO. : 7,989,775 B2  Page 1 of 1
APPLICATION NO. : 12/848988
DATED : August 2, 2011
INVENTOR(S) : Edward H. Allen et al.

It is certified that error appears in the above-identified patent and that said Letters Patent is hereby corrected as shown below:

IN THE SPECIFICATION:

In Column 8, Line 55:   Replace "state $\alpha|A_g\rangle + + \rangle\beta|B_g\rangle -- \rangle$", with -- state $\alpha|A_g\rangle | + + \rangle\beta|B_g\rangle |-- \rangle$ --

Signed and Sealed this
Third Day of January, 2012

David J. Kappos
*Director of the United States Patent and Trademark Office*